United States Patent
Uyeki

(10) Patent No.: US 10,867,315 B2
(45) Date of Patent: Dec. 15, 2020

(54) SYSTEM AND METHOD FOR IMPLEMENTING A DEMAND RESPONSE EVENT WITH VARIABLE INCENTIVES FOR VEHICLES

(71) Applicant: Honda Motor Co., Ltd., Tokyo (JP)

(72) Inventor: Robert M. Uyeki, Torrance, CA (US)

(73) Assignee: Honda Motor Co., Ltd., Tokyo (JP)

( * ) Notice: Subject to any disclaimer, the term of this patent is extended or adjusted under 35 U.S.C. 154(b) by 429 days.

(21) Appl. No.: 15/437,181

(22) Filed: Feb. 20, 2017

(65) Prior Publication Data
US 2018/0240141 A1    Aug. 23, 2018

(51) Int. Cl.
G06Q 30/02    (2012.01)

(52) U.S. Cl.
CPC .................. G06Q 30/0219 (2013.01)

(58) Field of Classification Search
USPC .......... 705/14.1–14.78, 22–27.7, 35–37, 412
See application file for complete search history.

(56) References Cited

U.S. PATENT DOCUMENTS

| | | | |
|---|---|---|---|
| 7,991,665 B2 | 8/2011 | Hafner et al. | |
| 8,019,697 B2 | 9/2011 | Ozog | |
| 8,364,609 B2 | 1/2013 | Ozog | |
| 8,457,802 B1 | 6/2013 | Steven et al. | |
| 8,706,650 B2 | 4/2014 | Ozog | |
| 8,892,264 B2 | 11/2014 | Steven et al. | |
| 9,159,108 B2 | 10/2015 | Steven et al. | |
| 9,209,625 B2 | 12/2015 | Tyagi et al. | |
| 2010/0076835 A1 | 3/2010 | Silverman | |
| 2011/0258018 A1 | 10/2011 | Tyagi et al. | |
| 2012/0078687 A1 | 3/2012 | Ghosh et al. | |
| 2012/0271686 A1 | 10/2012 | Silverman | |
| 2013/0035992 A1 | 2/2013 | Silverman | |
| 2014/0062195 A1* | 3/2014 | Bruschi ................... B60L 53/68 307/38 |
| 2014/0148963 A1 | 5/2014 | Ozog | |
| 2014/0188295 A1 | 7/2014 | Saito et al. | |
| 2014/0278687 A1 | 9/2014 | McConky et al. | |
| 2014/0316876 A1 | 10/2014 | Silverman | |
| 2015/0019032 A1 | 1/2015 | Koch et al. | |

(Continued)

FOREIGN PATENT DOCUMENTS

WO    WO-2012161993 A2 *  11/2012  .............. B60L 53/65

OTHER PUBLICATIONS

Faruqui, Ahmad et al. "Will Smart Prices Induce Smart Charging of Electric Vehicles?" The Brattle Group Discussion Paper dated Jul. 2011, 15 pages.

Primary Examiner — E Carvalho
(74) Attorney, Agent, or Firm — Rankin, Hill & Clark LLP

(57) ABSTRACT

A computer-implemented method for implementing a demand response (DR) event includes receiving a demand request (DR) signal for the DR event, determining a vehicle specific incentive price range for each vehicle of a group of vehicles, and selecting vehicles from the group of vehicles to form a subgroup of vehicles. The subgroup of vehicles maximize a number of vehicles participating in the DR event and maximize a profit of each vehicle in the subgroup of vehicles based on the vehicle specific incentive price range for each vehicle in the group of vehicles, subject to the DR incentive amount. The DR signal is transmitted to each vehicle in the subgroup of vehicles.

20 Claims, 4 Drawing Sheets

(56) References Cited

U.S. PATENT DOCUMENTS

| | | |
|---|---|---|
| 2015/0019275 A1 | 1/2015 | Koch |
| 2015/0019283 A1 | 1/2015 | Koch |
| 2015/0170171 A1 | 6/2015 | McCurnin et al. |
| 2015/0170176 A1 | 6/2015 | Doms |
| 2015/0213466 A1 | 7/2015 | Mirzazad Barijough et al. |
| 2015/0324817 A1 | 11/2015 | Chen et al. |
| 2015/0330645 A1 | 11/2015 | Speranzon et al. |
| 2017/0005515 A1* | 1/2017 | Sanders .................. H02J 3/32 |
| 2017/0357224 A1* | 12/2017 | Berrien .................. F24F 11/62 |

* cited by examiner

SYSTEM AND METHOD FOR IMPLEMENTING A DEMAND RESPONSE EVENT WITH VARIABLE INCENTIVES FOR VEHICLES

BACKGROUND

Demand response (DR) programs and events are used by utility companies to influence the amount of electricity an end user is using at a certain period of time. The intention is that the end user will use less electricity that they normally would use at this certain period of time to better balance supply and demand. For example, DR events can be implemented to prevent electricity shortages, brownouts, blackouts, and other power management issues. To encourage end users to participate in DR events, incentives are provided to the end user, for example, incentive payments, reduced electric rates, among other rewards. Vehicle original equipment manufacturers (OEMs) can leverage these incentives for their electric vehicles and customers.

BRIEF DESCRIPTION

According to one aspect, a computer-implemented method for implementing a demand response (DR) event includes receiving a demand request (DR) signal for the DR event including DR event parameters. The DR event parameters include an energy consumption reduction amount and a DR incentive amount. The method includes determining a vehicle specific incentive price range for each vehicle of a plurality of vehicles. The vehicle specific incentive price range includes at least a first incentive amount and a second incentive amount. The first incentive amount and the second incentive amount are amounts each vehicle is willing to accept to participate in the DR event and the first incentive amount is greater than the second incentive amount. The vehicle specific incentive price range is based on a DR profile of each vehicle of the plurality of vehicles. The method includes selecting vehicles from the plurality of vehicles to form a subgroup of vehicles that maximize a number of vehicles participating in the DR event and maximize a profit of each vehicle in the subgroup of vehicles based on the vehicle specific incentive price range for each vehicle in the plurality of vehicles, subject to the DR incentive amount. Further, the method includes transmitting the DR signal to each vehicle in the subgroup of vehicles.

According to another aspect, a system for implementing a demand response (DR) event includes an original equipment manufacturer (OEM) server operably connected for computer communication to a utility server and a plurality of vehicles. The OEM server includes a processor storing executable code, and the processor receives from the utility server a DR signal for the DR event, the DR signal including an energy consumption reduction amount and a DR incentive amount. The processor determines a vehicle specific incentive price range for each vehicle of the plurality of vehicles. The vehicle specific incentive price range includes at least a first incentive amount and a second incentive amount and the first incentive amount and the second incentive amount are amounts each vehicle is willing to accept to participate in the DR event. The first incentive amount is greater than the second incentive amount. The vehicle specific incentive price range is based on a DR profile of each vehicle of the plurality of vehicles. The processor selects vehicles from the plurality of vehicles to form a subgroup of vehicles by maximizing a number of vehicles participating in the DR event and maximizing a profit of each vehicle in the subgroup of vehicles based on the vehicle specific incentive price range for each vehicle in the plurality of vehicles, subject to the DR incentive amount. Further, the processor transmits the DR signal to each vehicle in the subgroup of vehicles.

According to a further aspect, a non-transitory computer-readable storage medium for implementing a demand response (DR) event including instructions that when executed by a processor, cause the processor to receive a demand request (DR) signal for the DR event including DR event parameters. The DR event parameters include an energy consumption reduction amount and a DR incentive amount. The processor determines a vehicle specific incentive price range for each vehicle of a plurality of vehicles. The vehicle specific incentive price range includes at least a first incentive amount and a second incentive amount, and the first incentive amount and the second incentive amount are amounts each vehicle is willing to accept to participate in the DR event. The first incentive amount is greater than the second incentive amount and the vehicle specific incentive price range is based on a DR profile of each vehicle of the plurality of vehicles. The processor selects vehicles from the plurality of vehicles to form a subgroup of vehicles that maximize a number of vehicles participating in the DR event and maximize a profit of each vehicle in the subgroup of vehicles based on the vehicle specific incentive price range for each vehicle in the plurality of vehicles, subject to the DR incentive amount. The processor transmits the DR signal to each vehicle in the subgroup of vehicles.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advances thereof, will be best understood by reference to the following detailed description of illustrative embodiments when read in conjunction with the accompanying drawings, wherein:

DETAILED DESCRIPTION

Figure 1:
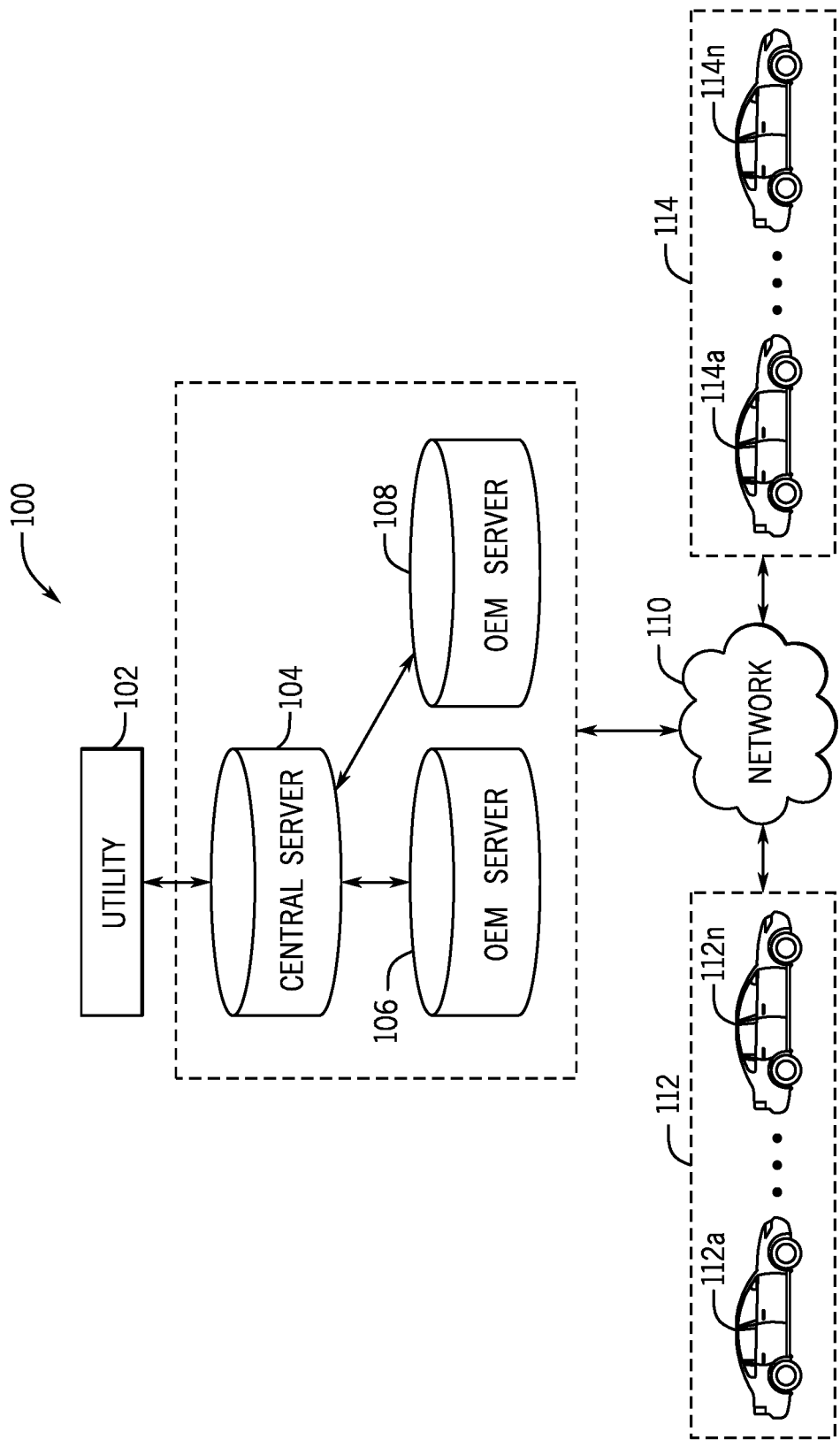
FIG. 1 is a block diagram of an operating environment for methods and systems for implementing a demand response (DR) event according to an exemplary embodiment.

The following includes definitions of selected terms employed herein. The definitions include various examples and/or forms of components that fall within the scope of a term and that can be used for implementation. The examples are not intended to be limiting. Further, the components discussed herein, can be combined, omitted or organized with other components or into organized into different architectures.

A "bus," as used herein, refers to an interconnected architecture that is operably connected to other computer components inside a computer or between computers. The bus can transfer data between the computer components. The bus can be a memory bus, a memory processor, a peripheral bus, an external bus, a crossbar switch, and/or a local bus, among others. The bus can also be a vehicle bus that interconnects components inside a vehicle using protocols such as Media Oriented Systems Transport (MOST), Processor Area network (CAN), Local Interconnect network (LIN), among others.

"Component", as used herein, refers to a computer-related entity (e.g., hardware, firmware, instructions in execution, combinations thereof). Computer components may include, for example, a process running on a processor, a processor, an object, an executable, a thread of execution, and a computer. A computer component(s) can reside within a process and/or thread. A computer component can be localized on one computer and/or can be distributed between multiple computers.

"Computer communication", as used herein, refers to a communication between two or more computing devices (e.g., computer, personal digital assistant, cellular telephone, network device) and can be, for example, a network transfer, a file transfer, an applet transfer, an email, a hypertext transfer protocol (HTTP) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

"Computer-readable medium," as used herein, refers to a non-transitory medium that stores instructions and/or data. A computer-readable medium can take forms, including, but not limited to, non-volatile media, and volatile media. Non-volatile media can include, for example, optical disks, magnetic disks, and so on. Volatile media can include, for example, semiconductor memories, dynamic memory, and so on. Common forms of a computer-readable medium can include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

A "database," as used herein, is used to refer to a table. In other examples, "database" can be used to refer to a set of tables. In still other examples, "database" can refer to a set of data stores and methods for accessing and/or manipulating those data stores. A database can be stored, for example, at a disk and/or a memory.

A "disk," as used herein can be, for example, a magnetic disk drive, a solid-state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device.

An "input/output device" (I/O device) as used herein can include devices for receiving input and/or devices for outputting data. The input and/or output can be for controlling different vehicle features which include various vehicle components, systems, and subsystems. Specifically, the term "input device" includes, but it not limited to: keyboard, microphones, pointing and selection devices, cameras, imaging devices, video cards, displays, push buttons, rotary knobs, and the like. The term "input device" additionally includes graphical input controls that take place within a user interface which can be displayed by various types of mechanisms such as software and hardware based controls, interfaces, touch screens, touch pads or plug and play devices. An "output device" includes, but is not limited to: display devices, and other devices for outputting information and functions.

A "logic circuitry," as used herein, includes, but is not limited to, hardware, firmware, a non-transitory computer readable medium that stores instructions, instructions in execution on a machine, and/or to cause (e.g., execute) an action(s) from another logic circuitry, module, method and/or system. Logic circuitry can include and/or be a part of a processor controlled by an algorithm, a discrete logic (e.g., ASIC), an analog circuit, a digital circuit, a programmed logic device, a memory device containing instructions, and so on. Logic can include one or more gates, combinations of gates, or other circuit components. Where multiple logics are described, it can be possible to incorporate the multiple logics into one physical logic. Similarly, where a single logic is described, it can be possible to distribute that single logic between multiple physical logics.

A "memory," as used herein can include volatile memory and/or nonvolatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDRSDRAM), and direct RAM bus RAM (DR-RAM). The memory can store an operating system that controls or allocates resources of a computing device.

An "operable connection," or a connection by which entities are "operably connected," is one in which signals, physical communications, and/or logical communications can be sent and/or received. An operable connection can include a wireless interface, a physical interface, a data interface, and/or an electrical interface.

A "module", as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module can also include logic, a software controlled microprocessor, a discrete logic circuit, an analog circuit, a digital circuit, a programmed logic device, a memory device containing executing instructions, logic gates, a combination of gates, and/or other circuit components. Multiple modules can be combined into one module and single modules can be distributed among multiple modules.

A "portable device", as used herein, is a computing device typically having a display screen with user input (e.g., touch, keyboard) and a processor for computing. Portable devices include, but are not limited to, handheld devices, mobile devices, smart phones, laptops, tablets and e-readers.

A "processor," as used herein, processes signals and performs general computing and arithmetic functions. Signals processed by the processor can include digital signals, data signals, computer instructions, processor instructions, messages, a bit, a bit stream, that can be received, transmitted and/or detected. Generally, the processor can be a variety of various processors including multiple single and multicore processors and co-processors and other multiple single and multicore processor and co-processor architectures. The processor can include logic circuitry to execute actions and/or algorithms.

A "vehicle," as used herein, refers to any moving vehicle that is capable of carrying one or more human occupants and is powered by any form of energy. The term "vehicle" includes, but is not limited to cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" can refer to an electric vehicle (EV) that is capable of carrying one or more human occupants and is powered entirely or partially by one or more electric motors powered by an electric battery. The EV can include battery electric vehicles (BEV) and plug-in hybrid electric vehicles (PHEV). The term "vehicle" can also refer to an autonomous vehicle and/or self-driving vehicle powered by any form of energy. The autonomous vehicle can carry one or more human occupants. Further, the term "vehicle" can include vehicles that are automated or non-automated with pre-determined paths or free-moving vehicles.

Referring now to the drawings, wherein the showings are for purposes of illustrating one or more exemplary embodiments and not for purposes of limiting the same, FIG. 1 is a block diagram of an operating environment 100 for implemented a demand response (DR) event according to an exemplary embodiment. The components of the operating environment 100, as well as the components of other systems, hardware architectures, and software architectures discussed herein, can be combined, omitted, or organized into different architectures for various embodiments. In FIG. 1, a utility company 102 can originate a request for a DR event by generating a DR signal (not shown) at a central server 104, which may communicate the DR signal to an original equipment manufacturer (OEM) server 106, and the OEM server 106 can transmit the DR signal via a network 110 to one or more vehicles of a plurality of vehicles 112, which includes a vehicle 112a to a vehicle 112n.

The DR signal generated by the utility company 102 indicates that the utility company 102 desires consumers (e.g., the central server 104, the OEM server 106, one or more of the plurality of vehicles 112) to reduce their load at a particular time. The DR signal can include DR event parameters that define the specifications and/or requirements of the DR event. For example, the DR event parameters can include an energy consumption reduction amount, which is an amount of energy (e.g., 100 kw) reduction required by the DR event. The DR event parameters can also include a period of time at which the energy consumption reduction amount must occur. Further, the DR event parameters can include a DR incentive amount (e.g., $1000), which can be an amount of money provided for participating in the DR event.

In the embodiment shown in FIG. 1, the utility company 102 can transmit via a network (not shown) the DR signal to the central server 104, or in other embodiments, directly to the OEM server 106. In one embodiment, the central server 104 is an Open Vehicle-Grid Integration Platform (OVGIP) server that that connects various nodes involved in providing and managing energy to Plug-in Electric Vehicles (PEVs) and/or electric vehicles (EVs). For example, the central server 104 can be operatively connected for computer communication to multiple OEM servers that are associated with PEVs and/or EVs. As shown in FIG. 1, the central server 104 is also operatively connected for computer communication to an OEM server 108. The OEM server 108 is operatively connected for computer communication via the network 110 to a plurality of vehicles 114, which includes a vehicle 114a to a vehicle 114n. Although FIG. 1 illustrates the central server 104 operatively connected for computer communication to two OEM servers (i.e., the OEM server 106, the OEM server 108), it is understood that the systems and methods described herein can be implemented with more than two OEM servers and each OEM server can be operatively connected for computer communication via the network 110 to PEVs and/or EVs associated with said OEM server. For example, in FIG. 1, the OEM server 106 is operatively connected for computer communication via the network 110 to the plurality of vehicles 112, which are PEVs and/or EVs. The plurality of vehicles 112 includes vehicles 112a to 112n, and it is understood that the plurality of vehicles 112 can include any number of vehicles. As will be discussed herein, each vehicle of the plurality of vehicles 112 can communicate with the OEM server 106 across the network 110 through a telematics control unit (TCU) or a transmitter/receiver of each vehicle of the plurality of vehicles 112. Alternatively, each vehicle of the plurality of vehicles 112 can communicate with the OEM server 106 using a mobile device (not shown) as an intermediary.

Figure 2:
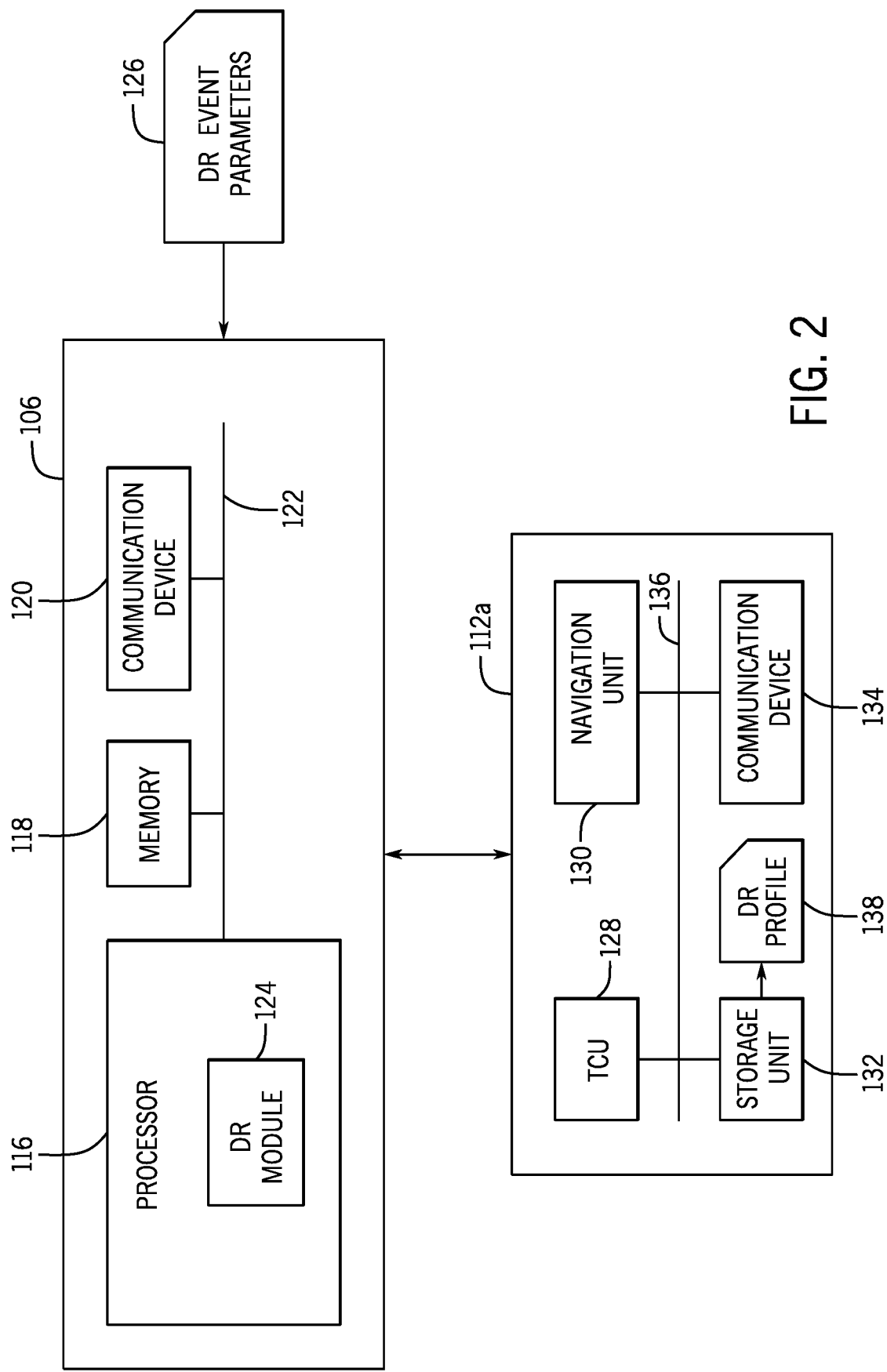
FIG. 2 is a detailed block diagram of the original equipment manufacturer (OEM) server and a vehicle shown in FIG. 1 according to an exemplary embodiment.

Referring now to FIG. 2, a detailed block diagram of the OEM server 106 and the vehicle 112a of the plurality of vehicles 112 according to an exemplary embodiment will be described. In FIG. 2, the OEM server 106 can include a processor 116, a memory 118, and a communication device 120, which are each operably connected for computer communication via a bus 122 and/or other wired and wireless technologies. The processor 116 can include logic circuitry with hardware, firmware, and software architecture frameworks for facilitating implementation of a DR event with the components of the operating environment 100. Thus, in some embodiments, the processor 116 can store application frameworks, kernels, libraries, drivers, application program interfaces, among others, to execute and control hardware and functions discussed herein. For example, in FIG. 2, the processor 116 includes a DR module 124, which will be discussed in further detail herein.

The memory 118 can store similar components as the processor 116 for execution by the processor 116. The communication device 120 can include software and hardware to facilitate data input and output between the components of the OEM server 106 and other components of the operating environment 100. Specifically, the communication device 120 can include network interface controllers (not shown) and other hardware and software that manages and/or monitors connections and controls bi-directional data transfer between the communication device 120 and other components of the operating environment 100. For example, the processor 116 can receive a DR signal, from for example, the utility company 102 and/or the central server 104. In particular, as shown in FIG. 2, the processor 116 of the OEM server 106 can receive the DR signal that includes DR event parameters 126, as discussed above. It is understood that the OEM server 106 can include other computer components not shown in FIG. 2. Further, the central server 104 and/or the OEM server 108 can include similar components as the OEM server 106, for example, the central server 104 and/or the OEM server 108 can include a processor and other computer components.

As mentioned above, the OEM server 106 is operatively connected for computer communication via the network 110 to each of the plurality of vehicles 112. For simplicity, in FIG. 2, a detailed block diagram of the vehicle 112 a of the plurality of vehicles 112 is shown, however, it is understood that each vehicle of the plurality of vehicles 112 can include similar computer components and functionality as described with the vehicle 112 a. In FIG. 2, the vehicle 112 a includes a telematics control unit (TCU) 128, a navigation unit 130, a memory 132, and a communication device 134, which are each operably connected for computer communication via a bus 136 and/or other wired and wireless technologies. The TCU 128 can include logic circuitry with hardware (e.g., a processor), firmware, and software architecture frameworks for facilitating implementation of a DR event with the components of the operating environment 100. Thus, in some embodiments, the TCU 128 can store application frameworks, kernels, libraries, drivers, application program interfaces, among others, to execute and control hardware, vehicle systems, and functions discussed herein.

The navigation unit 130 can be a global positioning unit for determining a current location of the vehicle 112a and destination route information of the vehicle 112a. The memory 132 can store similar components as the TCU 128 for execution by the TCU 128. Further, in some embodiments, which will be discussed herein, the memory 132 can store a DR profile 138. The communication device 134 can include software and hardware to facilitate data input and output between the components of the vehicle 112a and other components of the operating environment 100. Specifically, the communication device 134 can include network interface controllers (not shown) and other hardware and software that manages and/or monitors connections and controls bi-directional data transfer between the communication device 134 and other components of the operating environment 100. For example, the TCU 128 can receive a DR signal from the OEM server 106.

Figure 3:
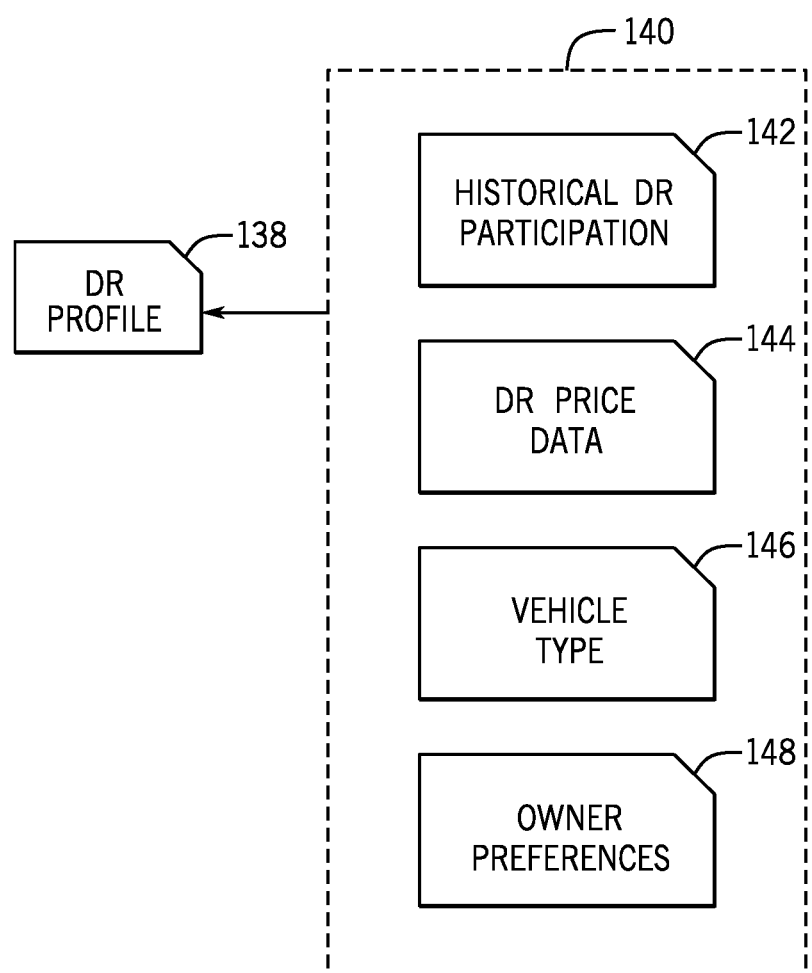
FIG. 3 is a data model of a DR profile according to an exemplary embodiment.

As mentioned above, the vehicle 112a can be associated with and/or store the DR profile 138. The DR profile 138 includes DR data regarding the vehicle 112a and/or an owner (not shown) of the vehicle 112a. Each vehicle of the plurality of vehicles 112 is associated with a DR profile. Although the DR profile 138 is shown stored at the vehicle 112a, it is understood that the DR profile 138 can be located at the OEM server 106 and/or stored remotely at a different server connected via the network 110. The DR profile 138 will now be described in more detail with respect to FIG. 3. FIG. 3 is an exemplary data model of the DR profile 138. The DR profile 138 can include data 140 associated with the vehicle 112a. For example, the DR profile 138 can include historical DR participation data 142 including data about past DR events the vehicle 112a has accepted, declined and/or canceled participation. The historical DR participation data 142 can include the detailed requirements of these past DR events (e.g., time, duration), incentive data (e.g., how much the vehicle 112a received for participation in the DR event), and other data related to past DR events.

The DR profile 138 can also include DR price data 144, which can be predetermined incentive prices input by the owner and/or driver of the vehicle 112a. The predetermined incentive prices are incentive amounts (e.g., monetary amounts) where the owner and/or driver of the vehicle 112a is likely to participate in a DR event. Said differently, the predetermined incentive prices are thresholds that must be met before participation in a DR event. As an illustrative example, the DR price data 144 can include a first incentive amount of $5.00 and a second incentive amount of $3.00. In this example, the owner and/or driver of the vehicle 112a is very likely to participate in a DR event with an incentive of $5.00, but could participate in the DR event at $3.00 if needed. As will be discussed in more detail herein, the DR price data 144 can be used to determine vehicle specific price ranges for each vehicle of the plurality of vehicles 112.

The DR profile 138 can also include data about the specifications of the vehicle 112a, for example, vehicle type data 146. The vehicle type data 146 can include, but is not limited to, vehicle model, vehicle year, engine cylinders, vehicle propulsion type (e.g., combustion, electric, hybrid, plug-in hybrid), vehicle class (e.g., car, bus, motorcycle, off-road vehicle, light truck, regular trucks). The DR profile 138 can also include owner preference data 148. Similar to the DR price data 144, the owner preference data 148 can be input by the owner and/or driver of the vehicle 112a. The owner preference data 148 can include preferences related to DR events. For example, the owner preference data 148 can include preferred days and/or periods of time for participating in DR events. As will be discussed in further detail herein, the DR profile 138 including the data 140 can be used to determine vehicle specific price ranges for each vehicle of the plurality of vehicles 112.

Figures 4, 5:
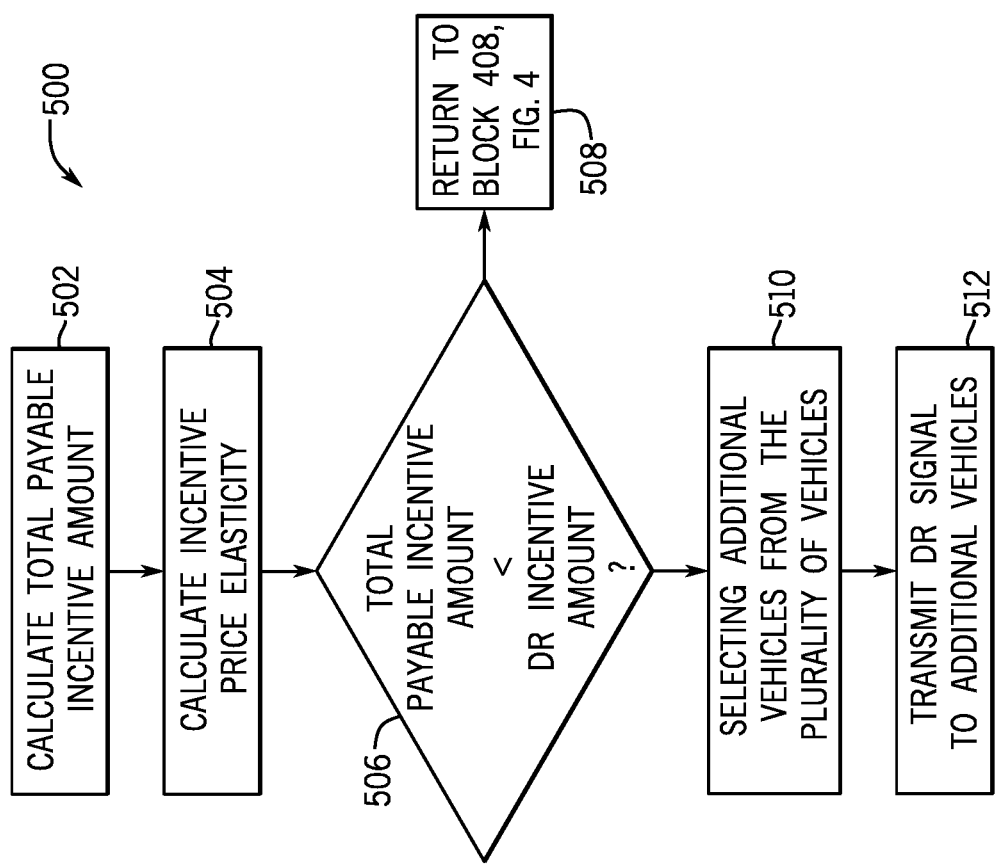
FIG. 4 is a flow diagram of a method for implementing a DR event according to an exemplary embodiment.
FIG. 5 is a flow diagram of a method for implementing a DR event according to an exemplary embodiment.

The components and systems described in FIGS. 1-3 will now be described in more detail with reference to FIG. 4 and a method 400 for implementing demand response (DR) events according to an exemplary embodiment. At block 402, the method 400 includes receiving a DR signal for the DR event including DR event parameters. For example, the utility company 102 transmits a DR signal to the central server 104 and/or the OEM server 106 that includes DR event parameters 126. The DR event parameters 126 define the specifications and/or requirements of the DR event. For example, the DR event parameters 126 can include an energy consumption reduction amount (e.g., 100 kw). The DR signal can specify a time period in which energy consumption should be reduced. For example, a start time of an energy consumption reduction period to begin immediately or in the future. Further, the time period can specify an end time of the energy consumption reduction period. The DR signal can also specify DR incentive amount. The DR incentive amount can be a monetary incentive. For example, $10.00 per kw reduction, or for 100 kw, $1000.00.

As discussed above, in some embodiments, the utility company 102 transmits the DR signal to the central server 104, which can manage implementation of DR events for more than one OEM. For example, as shown in FIG. 1, two OEM servers can be communicatively coupled to the central server 104, namely, the OEM server 106 and the OEM server 108. The OEM server 106 is communicatively coupled to the plurality of vehicles 112 associated with the OEM server 106, and the OEM server 108 is communicatively coupled to the plurality of vehicles 114 associated with the OEM server 108. In this embodiment, the central server 104 can calculate a DR incentive amount specific to each OEM, for example, based on the number of OEM servers and the number of vehicles currently available to participate in the DR event. Thus, using the example above with a DR incentive amount of $10.00 per kw reduction with a 100 kw energy consumption reduction amount, if the OEM server 106 and the OEM server 108 both have vehicles available to participate in the DR event, the central server 104 can calculate a DR incentive amount of $500.00 for the OEM server 106 and a DR incentive amount of $500.00 for the OEM server 108. Alternatively, if the OEM server 106 has vehicles available to participate in the DR event and the OEM server 108 does not have vehicles available to participate in the DR event, the central server 104 can calculate a DR incentive amount of $1000.00 for the OEM server 106 and a DR incentive amount of $0.00 for the OEM server 108. The central server 104 can transmit the DR signal, including the relevant DR parameters (e.g., energy consumption reduction amount, DR incentive amount) to the OEM server 106 and/or the OEM server 108. For example, with respect to the OEM server 106, the processor 116 can receive the DR signal via the communication device 120.

Once the OEM server 106 has received the DR signal and the DR event parameters, the OEM server 106 manages how the DR event is implemented according to the plurality of vehicles 112 to achieve the DR event parameters. In some situations, the OEM server 106 would maximize the amount of capacity available to participate in the DR event by opting in all vehicles of the plurality of vehicles 112 to participate in the DR event and giving each vehicle an equal share of the DR incentive amount. However, maximizing the amount of capacity online may not be realistic since there may be more participants for the DR event than needed to achieve an energy consumption reduction amount, more than one OEM may be participating in the DR event, and some vehicles may never participate, but would still be given equal incentives. Accordingly, in one embodiment, the OEM server 106 can select specific vehicles from the plurality of vehicles 112 and allocate a variable incentive specific to each vehicle to maximize participation and profit for vehicles associated with the OEM server 106.

Accordingly, and with reference again to FIG. 4, the method 400 includes at block 404 determining a vehicle specific incentive price range for each vehicle of a plurality of vehicles. As shown in FIG. 1, the OEM server 106 is communicatively coupled to the plurality of vehicles 112, which includes the vehicle 112a to the vehicle 112n. For each vehicle of the plurality of vehicles 112, the DR module 124 can determine and/or calculate a vehicle specific incentive price range based at least upon a DR profile (e.g., the DR profile 138) of each vehicle of the plurality of vehicles 112. The vehicle specific incentive price range is one or more incentive amounts (e.g. monetary amounts) that the consumer (e.g., owner and/or driver) of a vehicle is willing to accept to participate in the DR event. As an illustrative example, the vehicle 112a may be willing to participate with a $20.00 incentive, while the vehicle 112b may be willing to participate with a $50.00 incentive.

As mentioned above, the vehicle specific incentive price range is based on a DR profile of each vehicle. As discussed above with FIGS. 1-3, each vehicle of the plurality of vehicles 112 can store and/or be associated with a DR profile. For example, in FIG. 2, the vehicle 112a stores a DR profile 138 at the memory 132. The DR profile 138 includes various information associated with the vehicle 112a as discussed with FIG. 3. In some embodiments, the vehicle incentive price range is specified by an owner of the vehicle 112a and stored in the DR profile 138, for example, as DR price data 144.

In some embodiments, the vehicle specific incentive price range includes more than one incentive amount. For example, the vehicle specific incentive price range for each vehicle includes at least a first incentive amount and a second incentive amount. The first incentive amount and the second incentive amount are amounts each vehicle is willing to accept to participate in the DR event. In some embodiments, the first incentive amount is greater than the second incentive amount. In other embodiments, the first incentive amount is assigned a priority over the second incentive amount, indicating a vehicle is more willing to participate in the DR event at the first incentive amount, but may be willing to participate in the DR event at the second incentive amount. As an illustrative example, the vehicle 112a can have a first incentive amount of $50.00 and a second incentive amount of $30.00. Thus, the vehicle 112a is more likely to participate in the DR event according to the first incentive amount, however, the vehicle 112a may participate in the DR event according to the second incentive amount if needed. In one embodiment, the vehicle specific incentive price range can be expressed mathematically in vector form as:

$$IP = (V(P_1, P_2)_1, \ldots V(P_1, P_2)_n) \quad (1)$$

where IP is a series of real values for each vehicle V of a plurality of vehicles, $P_1$ is a first incentive amount, and $P_2$ is a second incentive amount. In some embodiments, $P_1$ is greater than $P_2$. It is understood that in some embodiments, the vehicle incentive price range can include more than two (2) values, for example, a first incentive amount, a second incentive amount, and a third incentive amount.

Table 1 below is an illustrative example of vehicle specific incentive price ranges and load capacity available for each vehicle of the plurality of vehicles 112 associated with the OEM server 106, where the total number of vehicles (i.e., n) is 8. Table 1 will be used herein with illustrative examples to better explain the systems and methods discussed, however, it is understood that the exemplary values are non-limiting and illustrative in nature.

TABLE 1

| IP | First incentive amount ($P_1$) | Second incentive amount ($P_2$) | Capacity (c) |
|---|---|---|---|
| $V(20,10)_{112a}$ | $20.00 | $10.00 | 5 kw |
| $V(20,10)_{112b}$ | $20.00 | $10.00 | 6 kw |
| $V(70,40)_{112c}$ | $70.00 | $40.00 | 10 kw |
| $V(70,50)_{112d}$ | $70.00 | $50.00 | 10 kw |
| $V(60,20)_{112e}$ | $60.00 | $20.00 | 4 kw |
| $V(50,30)_{112f}$ | $50.00 | $30.00 | 5 kw |
| $V(80,70)_{112g}$ | $80.00 | $70.00 | 10 kw |
| $V(90,70)_{112h}$ | $90.00 | $70.00 | 10 kw |

Referring again to FIG. 4, at block 406 the method 400 includes selecting vehicles from the plurality of vehicles to form a subgroup of vehicles. The vehicles in the subgroup of vehicles are selected to participate in the DR event. In one embodiment, the DR module 124 executed by the processor 116 can select vehicles from the plurality of vehicles 112 to form a subgroup of vehicles that maximize a number of vehicles participating in the DR event and maximize a profit of each vehicle in the subgroup of vehicles based on the vehicle specific incentive price range for each vehicle in the plurality of vehicles, subject to the DR incentive amount. Accordingly, based on the incentive price range for each vehicle in the plurality of vehicles, a maximum number of vehicles likely to participate are chosen at a variable payable incentive amount price that maximizes the profit for said vehicles. Thus, the OEM can leverage the DR incentive amount to benefit its vehicles and consumers. In one embodiment, maximizing a number of vehicles participating in the DR event and maximizing a profit of each vehicle in the subgroup of vehicles based on the vehicle specific incentive price range for each vehicle in the plurality of vehicles, subject to the DR incentive amount can be expressed mathematically as:

$$\max \sum_{i=1}^{IPn} x_i \quad (2)$$

$$\text{subject to } \sum_{i=1}^{IPn} V(P_1, P_2) x_i \leq DRI \text{ and } x_i \in \{0, 1\}$$

where DRI is the DR incentive amount and $X_i$ represents which vehicles to include in the subgroup of vehicles. Thus, the sum of the vehicle specific incentive price range for each vehicle is maximized so that the sum is less than or equal to the DR incentive amount.

As an illustrative example, and with reference to the values in Table 1, a DR event has a DR incentive amount of $200.00. Based on this DR incentive amount, the DR module 124 selects vehicles 112*a*, 112*b*, 112*e*, and 112*f* from the plurality of vehicles 112*a* to be included with the subgroup of vehicles based on the first incentive amount of each of said vehicles. In this example, the vehicle 112*a* is allocated $20.00, the vehicle 112*b* is allocated $20.00, the vehicle 112*e* is allocated $60.00, and the vehicle 112*f* is allocated $50.00. The incentives allocated total $150.00. This selection of vehicles allows for the maximum number of vehicles to participate (4) at the maximum incentive amount (the first incentive amount) of each vehicle taking into consideration the DR incentive amount of $200.00. In this embodiment, selecting vehicles from the plurality of vehicles is based on the first incentive amount for each vehicle, where the first incentive amount is greater than the second incentive amount for each vehicle. Accordingly, equation (2), can also be written as:

$$\max \sum_{i=1}^{IPn} x_i \quad (3)$$

$$\text{subject to } \sum_{i=1}^{IPn} V(P_1)x_i \leq DRI \text{ and } x_i \in \{0, 1\}$$

In some embodiments, maximizing a number of vehicles participating in the DR event and maximizing a profit of each vehicle in the subgroup of vehicles based on the vehicle specific incentive price range for each vehicle in the plurality of vehicles is subject to the DR incentive amount and the energy consumption reduction amount required by the DR. Accordingly, equations (2) and (3) above can also be subject to the energy consumption amount. As an illustrative example, equation (2) can be re-written as:

$$\max \sum_{i=1}^{IPn} x_i \quad (4)$$

$$\text{subject to } \sum_{i=1}^{IPn} V(P_1, P_2)x_i \leq DRI \text{ and } V(c) \leq DRC \text{ and } x_i \in \{0, 1\}$$

where DRC is the energy consumption amount required by the DR event. In this embodiment, profits are maximized for each vehicle ensuring that the load criteria (i.e., the energy consumption amount) for the DR event is satisfied. In this embodiment, the selecting the group of vehicles includes selecting each vehicle of the group of vehicles with the lowest (e.g., minimum) vehicle specific incentive price range subject to the DR incentive amount and the energy consumption amount. For example, a selection sort can be performed on the vehicle specific incentive price range for each vehicle. To maximize profits, the lowest vehicle specific incentive price ranges are considered first and increased subject to the DR incentive amount (e.g., ensuring incentives are available) and the energy consumption amount.

In another embodiment, selecting vehicles from the plurality of vehicles to form a subgroup of vehicles at block 406 is based on maximizing a number of vehicles participating in the DR event and maximizing a profit of each vehicle in the subgroup of vehicles based on the vehicle specific incentive price range for each vehicle in the plurality of vehicles, subject to the DR incentive amount and a predetermined incentive threshold. For example, in one embodiment, the OEM server 106 via the DR module 124 may select vehicles from the plurality of vehicles 112 that have a vehicle specific incentive price range less than or equal to a predetermined incentive threshold. As an illustrative example, a predetermined incentive threshold is set to $20.00. The DR module 124 selects vehicles from the plurality of vehicles 112 having a first incentive amount or a second incentive amount equal to $20.00 and subject to the DR incentive amount of $200.00. In this example, the DR module 124 selects vehicles 112*a*, 112*b*, and 112*e*. The vehicle 112*a* has a first incentive amount of $20.00, the vehicles 112*b* has a first incentive amount of $20.00, and the vehicle 112*e* has a second incentive amount of $20.00. In some embodiments, the DR module 124 selects vehicles from the plurality of vehicles 112 having a first incentive amount equal to $20.00. According to this embodiment, in the illustrative example, the DR module 124 selects vehicles 112*a* and 112*b*, which both have a first incentive amount of $20.00. The optimization formula according to this embodiment where IT represents the predetermined incentive threshold can be expressed mathematically as:

$$\max \sum_{i=1}^{IPn} x_i \quad (5)$$

$$\text{subject to } \sum_{i=1}^{IPn} (V(P_1) \leq IT) \text{ and } (V(P_1)x_i) \leq DRI \text{ and } x_i \in \{0, 1\}$$

In order to select vehicles to maximize participation and profit, an incentive amount from the vehicle specific incentive price range for each vehicle is determined. Specifically, the first incentive amount ($P_1$) or the second incentive amount ($P_2$) must be selected based on the maximization formulas above for each vehicles as the amount payable to the vehicle for participating in the DR event. Thus, in one embodiment, selecting vehicles from the plurality of vehicles to form a subgroup of vehicles includes calculating a payable incentive amount for each vehicle in the subgroup of vehicles by selecting a vehicle incentive amount from the vehicle specific incentive price range for each vehicle in the subgroup of vehicles that maximizes the profit of each vehicle in the subgroup of vehicles subject to the DR incentive amount. According to one embodiment, the payable incentive amount for each vehicles is the first incentive amount. In some embodiments, the first incentive amount is greater than the second incentive amount. Thus, in this embodiment, the payable incentive amount for each vehicle is determine to be the largest value in the vehicle specific incentive price range. Referring to the illustrative example again, the DR module 124 determines a payable incentive amount of $20.00 for the vehicle 112*a* a payable incentive amount of $20.00 for the vehicle 112*b*, a payable incentive amount of $60.00 for the vehicle 112*e*, and a payable incentive amount of $50.00 for the vehicle 112*f*.

In one embodiment, the method 400 can proceed to block 408 where the method 400 includes transmitting the DR signal to the vehicles in the subgroup of vehicles. In one embodiment, the DR module 124 transmits the DR signal to the TCU of each vehicle in the subgroup of vehicles. For example, the DR module 124 can transmit the DR signal to the TCU 128 of the vehicle 112*a*. In one embodiment, the DR signal transmitted to the vehicles in the subgroup of vehicles can include the payable incentive amount for each vehicle. Referring again to the illustrative example, the DR module 124 transmits the DR signal to each vehicle in the subgroup of vehicles, namely, the vehicles 112*a*, 112*b*, 112*e*, and 112*f*.

As discussed above, maximizing participation and profit is subject to the DR incentive amount. Although the calculations discussed above with respect to blocks 404 and 406 maximize participation and profit, it some situations, the DR incentive amount is not maximized (e.g., there are remaining incentives available). Referring now to FIG. 5, a method 500 for implementing a DR event according to an exemplary embodiment. It is understood that in some embodiments one or more of the blocks of FIG. 5 can be implemented with the method 400 of FIG. 4. For example, blocks 502-512 can be implemented with block 404 and/or block 406.

At block 502, the method 500 includes calculating a total payable incentive amount as an aggregate of the payable incentive amount for each vehicle in the subgroup of vehicles. Referring to the illustrative example again, the DR module 124 calculates a total payable incentive amount of $150.00 by aggregating the payable incentive amounts of each vehicle in the subgroup of vehicles (i.e., vehicles 112*a*, 112*b*, 112*e*, and 112*f*).

In one embodiment, the DR module 124 can compare the total payable incentive amount to the DR incentive amount. Accordingly, at block 504, the method 500 includes determining whether the total payable incentive amount is less than the DR incentive amount. If the determination at block 504 is NO, the method 500 proceeds to block 506 and returns to block 408 of FIG. 4. If the determination at block 504 is YES, the method 500 can optionally include at block 508, calculating an incentive price elasticity, which will be discussed in more detail herein.

At block 510, the method 500 includes selecting vehicles from the plurality of vehicles that are not included within the subgroup of vehicles to form a remaining subgroup of vehicles based on the vehicle specific incentive price range for each vehicle from the plurality of vehicles and a difference between the total payable incentive amount and the DR incentive amount. In this embodiment, selecting the vehicles from the plurality of vehicles 112 that are not included with the subgroup of vehicles to form the remaining subgroup of vehicles is based on the second incentive amount for each vehicle from the plurality of vehicles 112 and the difference between the total payable incentive amount and the DR incentive amount. Here, the second incentive amount is less than the first incentive amount. The method 500 can then proceed to block 512 where the DR module 124 can transmit the DR signal to each vehicle in the remaining subgroup of vehicles.

Alternatively, in one embodiment, block 510 includes selecting additional vehicles from the plurality of vehicles that are not included within the subgroup of vehicles based on the vehicle specific incentive price range for each vehicle from the plurality of vehicles and a difference between the total payable incentive amount and the DR incentive amount. In this embodiment, selecting the additional vehicles is based on the second incentive amount for each vehicle from the plurality of vehicles 112 and the difference between the total payable incentive amount and the DR incentive amount. The method 500 can then proceed to block 512 where the DR module 124 can transmit the DR signal to the additional vehicles.

Referring again to the illustrative example, the total payable incentive amount is $150.00 and the DR incentive amount is $200.00, thus the difference between the total payable incentive amount and the DR incentive amount is $50.00. The remaining vehicles in the plurality of vehicles 112 not include within the subgroup of vehicles include vehicles 112*c*, 112*d*, 112*g*, and 112*h*. Accordingly, based on the vehicle specific incentive price range for each of said vehicles, the DR module selects vehicles that maximize a profit subject to the difference between the total payable incentive amount and the DR incentive amount. In this example, the DR module 124 selects the vehicle 112*d* based on the second incentive amount of $50.00 and can transmit the DR signal to the vehicle 112*d*.

As mentioned above, in one embodiment, selecting vehicles from the plurality of vehicles to form a subgroup of vehicles can be based on incentive price elasticity. Accordingly at block 508, the method 500 can include calculating an incentive price elasticity based on the vehicle specific incentive price range for each vehicle of the plurality of vehicles. The incentive price elasticity is a ratio of a proportionate change in participation in the DR event to a proportionate change of the vehicle specific incentive price range for each vehicle of the plurality of vehicles. The proportionate change of the vehicle specific incentive price range. Said differently, the incentive price elasticity is a percentage of a change of likely participation in a DR event based on an increase in a first incentive amount and/or a second incentive amount of each vehicle in the plurality of vehicles 112.

As an illustrative example, and as discussed above, in some embodiments, the subgroup of vehicles is selected based on a predetermined incentive threshold. According to the illustrative example with respect to block 406 of FIG. 4, the predetermined incentive threshold is $20.00 and the subgroup of vehicles includes vehicles 112*a* and 112*b*, each having a first incentive amount of $20.00. In this embodiment, the incentive price elasticity can be calculated to increase the number of vehicles participating in the DR event at an increased predetermined incentive threshold.

For example, as an illustrative example, the first predetermined incentive threshold is $20.00 with two (2) vehicles participating at $20.00. If the first predetermined incentive threshold is increased to $50.00, an additional three (3) vehicles are likely to participate according to the first incentive amount or the second incentive amount, namely vehicle 112*c* with a second incentive amount of $40.00, vehicle 112*d* with a second incentive amount of $50.00, and vehicle 112*f* with a first incentive amount of $50.00. Thus, the incentive price elasticity from $20.00 to $50.00 is approximately 150%. The incentive price elasticity can be used to select additional vehicles to participate in the DR event.

In some embodiments, block 506 and/or 510 can include comparing a profit margin of each vehicle selected to participate in the DR event to a minimum profit margin. The minimum profit margin can be set by the OEM to ensure that all vehicles who participate in the DR even will make a certain percentage or amount of profit. Accordingly, in some embodiments, even if the total payable incentive amount is less than the DR incentive amount at block 506, additional vehicles may not be selected at block 510 if the minimum profit margin is not maintained. Accordingly, in one embodiment, maximizing a number of vehicles participating in the DR event and maximizing a profit of each vehicle in the subgroup of vehicles and/or the remaining subgroup of vehicles is subject to a minimum profit margin.

Referring again to FIG. 1, the method 500 proceeds to block 510 and the DR module 124 selects vehicles from the plurality of vehicles that are not included with the subgroup of vehicles to form a remaining subgroup of vehicles based on the vehicle specific incentive price range for each vehicle from the plurality of vehicles, a difference between the total payable incentive amount, the DR incentive amount, and the incentive price elasticity. At block 512, the DR module 124 can transmit the DR signal each vehicle in the remaining subgroup of vehicles. In an alternative embodiment, at block 510, the method 500 includes selecting additional vehicles from the plurality of vehicles that are not included with the subgroup of vehicles based on the vehicle specific incentive price range for each vehicle from the plurality of vehicles, a difference between the total payable incentive amount, the DR incentive amount, and the incentive price elasticity. At block 512, the DR module 124 can transmit the DR signal to the additional vehicles. Thus, the vehicles are notified of the additional incentives that are available.

The embodiments discussed herein can also be described and implemented in the context of non-transitory computer-readable storage medium storing computer-executable instructions. Non-transitory computer-readable storage media includes computer storage media and communication media. For example, flash memory drives, digital versatile discs (DVDs), compact discs (CDs), floppy disks, and tape cassettes. Non-transitory computer-readable storage media can include volatile and nonvolatile, removable and non-removable media implemented in any method or technology for storage of information such as computer readable instructions, data structures, modules or other data. Non-transitory computer readable storage media excludes transitory and propagated data signals.

It will be appreciated that various implementations of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A computer-implemented method for implementing a demand response (DR) event, comprising:
  receiving a DR signal from a central server for the DR event including DR event parameters, wherein the DR event parameters include an energy consumption reduction amount and a DR incentive amount;
  determining a vehicle specific incentive price range for each vehicle of a plurality of vehicles operatively connected to an electric vehicle network and associated with an original equipment manufacturer (OEM), wherein the vehicle specific incentive price range includes at least a first incentive amount and a second incentive amount, wherein the first incentive amount and the second incentive amount are amounts each vehicle participant is willing to accept to participate in the DR event and the first incentive amount is greater than the second incentive amount, wherein the vehicle specific incentive price range is based on data from a DR profile of each vehicle of the plurality of vehicles;
  selecting vehicles from the plurality of vehicles to form a subgroup of vehicles that maximize a number of vehicles participating in the DR event and maximize a profit of each vehicle in the subgroup of vehicles based on the vehicle specific incentive price range for each vehicle in the plurality of vehicles, subject to the DR incentive amount;
  and transmitting the DR signal to a telematics control unit (TCU) of each vehicle in the subgroup of vehicles, wherein the TCU of each vehicle in the subgroup of vehicles executes energy consumption according to the DR event parameters of the DR signal.

2. The computer-implemented method of claim 1, including calculating a payable incentive amount for each vehicle in the subgroup of vehicles by selecting a vehicle incentive amount from the vehicle specific incentive price range for each vehicle in the subgroup of vehicles that maximizes the profit of each vehicle in the subgroup of vehicles subject to the DR incentive amount.

3. The computer-implemented method of claim 2, including calculating a total payable incentive amount as an aggregate of the payable incentive amount for each vehicle in the subgroup of vehicles.

4. The computer-implemented method of claim 3, including upon determining the total payable incentive amount is less than the DR incentive amount, selecting vehicles from the plurality of vehicles that are not included within the subgroup of vehicles to form a remaining subgroup of vehicles based on the vehicle specific incentive price range for each vehicle from the plurality of vehicles and a difference between the total payable incentive amount and the DR incentive amount.

5. The computer-implemented method of claim 4, including transmitting the DR signal to each vehicle in the remaining subgroup of vehicles.

6. The computer-implemented method of claim 4, wherein selecting the vehicles from the plurality of vehicles that are not included with the subgroup of vehicles to form the remaining subgroup of vehicles is based on the second incentive amount for each vehicle from the plurality of vehicles and the difference between the total payable incentive amount and the DR incentive amount.

7. The computer-implemented method of claim 1, including calculating an incentive price elasticity based on the vehicle specific incentive price range for each vehicle of the plurality of vehicles, wherein the incentive price elasticity is a ratio of a proportionate change in participation in the DR event to a proportionate change of the vehicle specific incentive price range for each vehicle of the plurality of vehicles.

8. The computer-implemented method of claim 7, including upon determining a total payable incentive amount is less than the DR incentive amount, selecting vehicles from the plurality of vehicles that are not included with the subgroup of vehicles to form a remaining subgroup of vehicles based on the vehicle specific incentive price range for each vehicle from the plurality of vehicles, a difference between the total payable incentive amount, the DR incentive amount, and the incentive price elasticity.

9. A system for implementing a demand response (DR) event, comprising:
  an original equipment manufacturer (OEM) server operably connected for computer communication to a central server and a plurality of vehicles associated with the OEM server using an electric vehicle network, wherein the OEM server includes a processor storing executable code, wherein the processor:
  receives from the central server a DR signal for the DR event, the DR signal including an energy consumption reduction amount and a DR incentive amount;
  determines a vehicle specific incentive price range for each vehicle of the plurality of vehicles, wherein the vehicle specific incentive price range includes at least a first incentive amount and a second incentive amount, wherein the first incentive amount and the second incentive amount are amounts each vehicle participant is willing to accept to participate in the DR event and the first incentive amount is greater than the second incentive amount, wherein the vehicle specific incentive price range is based on a DR profile of each vehicle of the plurality of vehicles;

selects vehicles from the plurality of vehicles to form a subgroup of vehicles by maximizing a number of vehicles participating in the DR event and maximizing a profit of each vehicle in the subgroup of vehicles based on the vehicle specific incentive price range for each vehicle in the plurality of vehicles, subject to the DR incentive amount; and transmits the DR signal to a telematics control unit (TCU) of each vehicle in the subgroup of vehicles to achieve the DR event, wherein the TCU of each vehicle in the subgroup of vehicles executes energy consumption according to the DR event parameters of the DR signal.

10. The system of claim 9, wherein the processor calculates a payable incentive amount for each vehicle in the subgroup of vehicles by selecting a vehicle incentive amount from the vehicle specific incentive price range for each vehicle in the subgroup of vehicles that maximizes the profit of each vehicle in the subgroup of vehicles subject to the DR incentive amount.

11. The system of claim 10, wherein the processor calculates a total payable incentive amount as an aggregate of the payable incentive amount for each vehicle in the subgroup of vehicles.

12. The system of claim 11, wherein the processor compares the total payable incentive amount to the DR incentive amount and upon determining the total payable incentive amount is less than the DR incentive amount, the processor selects additional vehicles from the plurality of vehicles that are not included with the subgroup of vehicles based on the vehicle specific incentive price range of each of the additional vehicles and a difference between the total payable incentive amount and the DR incentive amount.

13. The system of claim 12, wherein the processor transmits the DR signal to the additional vehicles.

14. The system of claim 9, wherein the processor selects the vehicles from the plurality of vehicles to form the subgroup of vehicles by maximizing the profit of the vehicles from the plurality of vehicles having the lowest first incentive amount.

15. The system of claim 14, wherein upon determining a sum of the lowest first vehicles incentive amount of each of the vehicles of the subgroup of vehicles is less than the DR incentive amount, the processor selects additional vehicles from the plurality of vehicles based on an incentive price elasticity of the vehicles specific incentive price range for remaining vehicles in the plurality of vehicles.

16. A non-transitory computer-readable storage medium for implementing a demand response (DR) event including instructions that when executed by a processor, cause the processor to:

receive a DR signal for the DR event including DR event parameters, wherein the DR event parameters include an energy consumption reduction amount and a DR incentive amount;

determine a vehicle specific incentive price range for each vehicle of a plurality of vehicles operatively connected to an electric vehicle network and associated with an original equipment manufacturer (OEM), wherein the vehicle specific incentive price range includes at least a first incentive amount and a second incentive amount, wherein the first incentive amount and the second incentive amount are amounts each vehicle participant is willing to accept to participate in the DR event and the first incentive amount is greater than the second incentive amount, wherein the vehicle specific incentive price range is based on a DR profile of each vehicle of the plurality of vehicles;

select vehicles from the plurality of vehicles to form a subgroup of vehicles that maximize a number of vehicles participating in the DR event and maximize a profit of each vehicle in the subgroup of vehicles based on the vehicle specific incentive price range for each vehicle in the plurality of vehicles, subject to the DR incentive amount; and transmit the DR signal to a telematics control unit (TCU) of each vehicle in the subgroup of vehicles to achieve the DR event, wherein the TCU of each vehicle in the subgroup of vehicles achieves the DR event by executing energy consumption according to the DR event parameters of the DR signal.

17. The non-transitory computer-readable storage medium of claim 16, wherein the processor calculates a payable incentive amount for each vehicle in the subgroup of vehicles by selecting a vehicle incentive amount from the vehicle specific incentive price range for each vehicle in the subgroup of vehicles that maximizes the profit of each vehicle in the subgroup of vehicles subject to the DR incentive amount.

18. The non-transitory computer-readable storage medium of claim 17, wherein the processor calculates a total payable incentive amount as an aggregate of the payable incentive amount for each vehicle in the subgroup of vehicles.

19. The non-transitory computer-readable storage medium of claim 18, including upon determining the total payable incentive amount is less than the DR incentive amount, the processor selects vehicles from the plurality of vehicles that are not included within the subgroup of vehicles to form a remaining subgroup of vehicles based on the vehicle specific incentive price range for each vehicle from the plurality of vehicles and a difference between the total payable incentive amount and the DR incentive amount.

20. The non-transitory computer-readable storage medium of claim 19, wherein the processor transmits the DR signal to each vehicle in the remaining subgroup of vehicles.

* * * * *